United States Patent Office 3,705,999
Patented Dec. 12, 1972

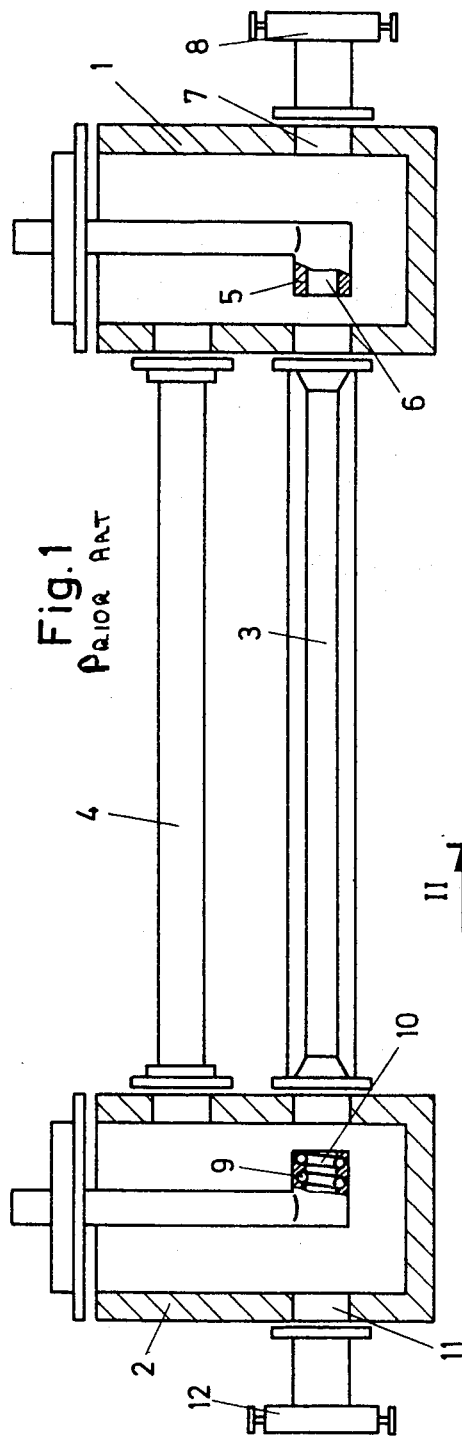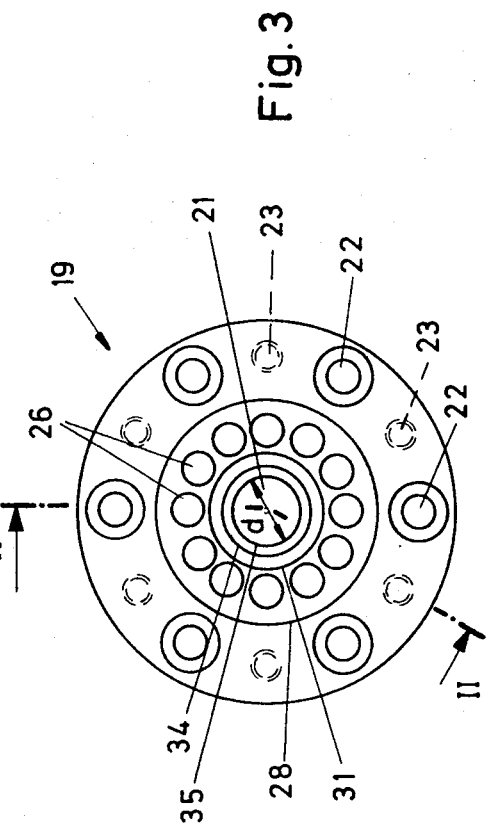

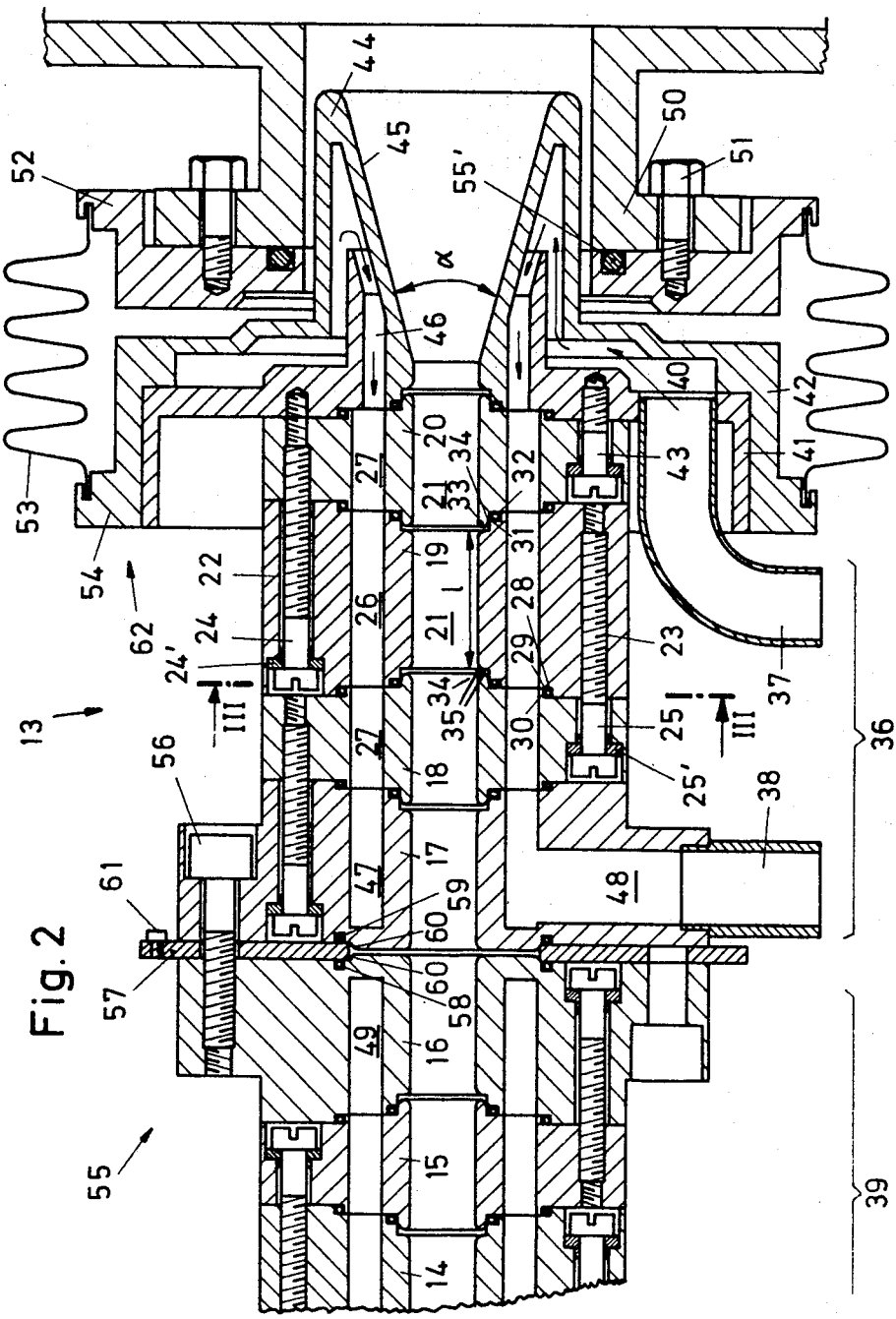

3,705,999
GAS DISCHARGE TUBE FOR A LASER
Karlheinz Victor Hermann Banse, Flamatt, Wolfgang Hagen Seelig and Jurg Hugo Steinger, Bern, and Gerd Bernd Herziger, Gumligen, Switzerland, assignors to Institut fur Angewandte Physik der Universitat Bern, Bern, Switzerland
Filed Apr. 9, 1971, Ser. No. 132,717
Claims priority, application Switzerland, Apr. 13, 1970, 5,451/70
Int. Cl. H01j 7/18
U.S. Cl. 313—197
12 Claims

ABSTRACT OF THE DISCLOSURE

A vacuum gas discharge tube of a laser assembly comprises a plurality of interconnected discs which are provided with aligned central bores to define a discharge column. Each disc has an anodic oxidation layer on its surface to electrically insulate it from the other discs and protect it against ion bombardment and ultra-violet rays from the discharge column. The discs are sealed by annular sealing rings seated in recesses in the discs and the rings are protected by shoulders which project beyond the rings to cover the same and protect them against the ion bombardment and ultra-violet rays.

BRIEF SUMMARY OF THE INVENTION

The invention relates to a vacuum gas discharge tube for a laser assembly with a body which surrounds the discharge column and consists of plurality of mutually electrically insulated metal discs which are provided with central openings which are mutually aligned and accommodate the discharge column. The construction of such discharge tubes is subject to much difficulty, as evident in an article by K. G. Hernqvist and J. R. Findley in the IEEE Journal of Quantum Electronics, February 1967.

Despite the fact that discs are used which are made of extremely heat resistant materials, such as tantalum and molybdenum, results are still unsatisfactory. In order to avoid the difficulties of a high-vacuum sealing between the discs mutually aligned by means of sapphire rods, it is known to mount the discs inside an outer sheath af quartz material. A high-vacuum sealing, i.e. a sealing which is effective for a vacuum of at least $10^{-5}$ torr inside the tube, is necessary because the tube must be evacuated of air, and other gases, at a high vacuum, before the tube is filled with the gas serving for gas discharge. Moreover, high-vacuum sealing is also necessary in order to prevent the partial pressure of the air and other foreign gases inside the tube from increasing above $10^{-5}$ torr during the operation of the tube, as this would be very disadvantageous for achieving the laser effect. Therefore, the sealing must be effective for a considerably higher vacuum than the low pressure of several torr which is maintained in the gas discharge tube during its operation.

A conventional discharge tube, containing argon and cooled by jets, is unserviceable after approximately 10 hours of use, since the ions emerging from the discharge column and impinging upon the walls of the bore very quickly destroy the same, and cause material to be broken away from the walls and contaminate and disrupt the gas discharge. Discs made of graphite with a high degree of purity have proven to be the only useful ones. However, high purity graphite is expensive and can be treated only with difficulty; in view of the development of still larger and more powerful discharge tubes, the use of the graphite is additionally undesirable for reasons of strength. Up to now, gas discharge tubes of the above mentioned type were produced with only very small bore diameters of approximately 1–3 mm., and even these provide unsatisfactory results. The larger the diameter, the greater the difficulties, since the degree of ionization increases, and thus a greater number of charged ions impinge upon the walls of the bore with a larger kinetic energy.

In an effect to obtain higher outputs, which necessitates an enlargement of the diameter of the bore, graphite discs were exclusively used heretofore with some success. These discs have also been arranged in an outer sheath. The obtention of a permanent high-vacuum sealing by other means is considerably impeded by the fact that the usual sealing materials age very rapidly as a result of the ion bombardment and the influence of the ultra-violet rays which emerge from the discharge column. Moreover, the ultra-violet rays may also have damaging influence on the walls of the bore, even though to a much lesser extent than the ions.

In order to substantially increase the output of the above mentioned discharge tube, it is proposed according to the invention to construct the discharge tube of discs made of a light metal which are rigidly interconnected and provided with an oxide layer on their surfaces, to insulate them electrically from each other and protect them from damage by ion bombardment and ultraviolet rays emanating form the discharge column. Sealing means are provided between the discs for sealing the discs against high vacuum of less than 10 torr maintained inside the tube, said sealing means being protected from the ion bombardment and ultraviolet rays by the formation of shoulders on the discs. Furthermore the discs are provided with holes arranged in a circular array around a central bore and mutually intercommunicating for conducting a cooling fluid.

Experiments have shown, that an extraordinary increase in the output of the discharge tube is obtained with the above construction, and that simultaneously with the simplification of the manufacture thereof.

BRIEF DESCRIPTION OF THE DRAWING

FIG. 1 is an elevation view schematically illustrating a known laser assembly;

FIG. 2 is a longitudinal cross-section of a portion of a gas discharge tube according to the invention; and FIG. 3 is a front elevational view of one of the discs of said tube as seen in the direction of the arrows III of FIG. 2.

DETAILED DESCRIPTION

Referring to FIG. 1 which shows a conventional laser assembly, therein is seen an anode chamber 1 and a cathode chamber 2 interconnected by means of a gas discharge tube 3 and a pressure compensation tube 4. The pressure compensation tube prevents the existence of a pressure difference between chambers 1 and 2, which may be filled with, for instance, argon at a pressure of approximately 1 torr, as a result of the gas discharge. An anode 5 provided with a passage 6 aligned with the tube 3 is arranged in the chamber 1, wherein light beams excited in the discharge column of the gas discharge tube 3 by stimulated emission may pass through said passage 6 and reach an opening 7, which is positioned opposite a mirror 8. In a similar manner, the cathode 9 arranged in the chamber 2 is provided with a passage 10, through which light rays may pass toward and through an opening 11 and strike a mirror 12 which, together with the mirror 8, constitute the optical resonator of the arrangement.

The gas discharge tube 13 as shown in FIG. 2 is constructed in accordance with the invention and corresponds to the tube 3 of the arrangement of FIG. 1. The tube 13 is assembled from a plurality of aluminum discs, some of which are illustrated and designated by numerals 14–

20. The disc 19 which is shown in FIG. 3 in front elevational view, is provided with a central bore 21, the diameter $d$ of which, for example, is 12 mm. and the length $l$, for instance, is 25 mm. All the discs are provided with similar bores 21, which cooperatively define the discharge column of the tube. The disc 19 is provided with an outer array of holes inclusive of six smooth holes 22 and six tapped holes 23 respectively receiving screws 24 and 25 which respectively connect the disc 19 with neighboring discs 18 and 20. The screws 24 and 25 are electrically insulated from the discs by respective insulation members 24' and 25'. It is to be noted, that the disc 19 is illustrated in FIG. 2 in cross-section along line II—II of FIG. 3, but that this section line does not govern the remainder of FIG. 2, wherein the cross-section of the single discs is chosen so as to show the significant details. The disc 19 is also provided with an inner array of smooth holes 26 which are twelve in number and are aligned with corresponding holes 27 of the same diameter and number provided in the adjacent discs 18 and 20, and which cooperatively define cooling channels.

The disc 19 is provided with an annular shoulder 28 at each of its opposite surfaces somewhat outwardly of the radius of the holes 26. A sealing ring 29 is abutted against shoulders 28 and against complementary annular shoulders 30, on adjacent respective discs 18 and 20. Somewhat inwardly of the holes 26, the disc 19 is provided on each of its sides with two additional annular shoulders 31, against which sealing rings 32 are abutted, the rings 32 also being abutted by complementary annular shoulders 33 on the respective discs 18 and 20. The shoulders 33 extend beyond a further annular shoulder 34 of the disc 19. The edges of the shoulders 33 and 34 are spaced from one another to form a small gap between adjacent discs and the projecting edges 35 of the discs are rounded in this region in order to eliminate an increase in local field intensity which could promote ion dispersion and flashing effects.

All the aluminum discs are provided with an insulating oxide layer, deposited by an oxidation process, for instance, an eloxal or ematal process. A very smooth and hard layer of aluminum oxide is obtained in the latter process, with incorporation of titanium and zirconium, and the layer is extremely resistant to the ion bombardment. The oxide layer is formed to a thickness of 10 to 100 m$\mu$ and the titanium is present in an amount of 40 g. per liter of solution with the zirconium present in smaller amounts.

The sealing rings may be made of metal, for example, gold or indium, or of plastic material, for instance "Viton" and/or "Teflon." The discs can also be interconnected by mans of adhesives with a low vapor pressure, particularly epoxy resins which ensure a high-vacuum sealing. However, the annular shoulders serve to protect the sealing rings from ion bombardment and ultra-violet rays which emanate from the discharge column.

Surprisingly, the sealing rings can be made of relatively inexpensive material as a result of water cooling (which will be explained in greater detail later) which is extremely efficient in conjunction with aluminum which has good heat conducting property, and of the unexpectedly high resistance to ion bombardment of the insulating layers formed by the anodic oxidation layer, as well as the shielding of the sealing rings to ion bombardment and ultra-violet rays by the shoulders on the discs. The sealing rings can be made of material which has not been heretofore considered suitable for use in such discharge tubes because of its relatively low strength and hardness at high temperatures. Namely, the output of the discharge tube, among other parameters, essentially depends on the diameter of the discharge column, and this can be substantially increased.

A diameter of 12 mm. as provided in the present example can be increased up to approximately 100 mm. based on thorough studies, with a pressure of the filling gas of less than 10 torr. In particular, gases such as Ar, Ne, Kr, Xe, Hg and mixtures thereof can be employed as filling gases. The length of the wall-stabilized discharge column is always large when compared with its diameter, and, in principle, no upper limit is established for this length. The length $l$ of the bores must preferably be small in such a gas laser discharge tube, as otherwise the steps in potential at the consecutive discs become too great, and the difference of potential between the center of the discharge column and the channel walls is periodically variable along the column, which is, among others, disadvantageous also for achieving an optimal light amplifying effect. While the coefficient $l/d$ in the known tube is between 7 to 10 and more, in the present example it is only slightly greater than 2. Thorough research shows, that the coefficient $l/d$ for the tubes under consideration is less than 3.

The discs 17–20 of the tube 13 as shown in FIG. 2 constitute a cooling section 36, which is provided with connecting conduits 37 and 38 for input and output of a cooling fluid, such as water. A further section 39, which is only shown in part, adjoins section 36, and the entire tube 13 includes, for instance, six to ten sections 39. A greater uniformity of the temperatures along the discharge column can be achieved by dividing the cooling stage into several sections.

Even though the cooling section 36, according to FIG. 2, consists of only four discs 17–20, the amount of discs per section may be somewhat larger, for instance, six to eight.

The connecting input conduit 37 leads into an outer annular chamber 40, which is defined by parts 41 and 42 which are rigidly connected to each other. The part 41 has a flange which is fastened to the disc 20 by screws 43 and the part 41 is connected to the part 42, for instance by an adhesive such as Araldite, or any other suitable manner of fastening. The part 42 is provided with a central projection 44, which extends into the anode chamber (not shown) in FIG. 2, but see FIG. 1. The projection 44 is provided with a conically tapering axial bore 45, which opens into the bore 21 of the disc 20. The taper angle $\alpha$ of the bore 45 can be 60–120°. The cooling fluid flows from the outer annular chamber 40 to a space between the parts 41 and 42 in the direction of the arrows to an inner annular chamber also defined by said parts and which is connected with the holes 27 of the disc 20. Finally, the cooling fluid reaches an annular chamber 47 in the disc 17, which is connected with the connecting conduit 38 via a radial bore 48.

An annular chamber 49, corresponding to the annular chamber 47, is provided in the disc 16 of the cooling section 39, which is connected to a connecting input conduit (not shown). A disc similar to the disc 17 is provided at the other end of the section 39. Parts corresponding to the parts 41 and 42 are mounted at the last cooling section on the side of the cathode, in order to establish connection with the cathode chamber 2 (FIG. 1).

A flange ring 52 is fastened to a flange 50 of the anode chamber by means of screws 51, and the flange ring surrounds the projection 44 with clearance and is connected at its outer periphery with the outer periphery of a flange 54 on part 42, by means of a metal bellows 53. The bellows 53 serves the purpose of compensating for changes in length of the tubular body 55 constituted of the discs resulting from temperature changes. A sealing member 55' is mounted between flange 50 and flange ring 52.

The consecutive discs 16 and 17 of both cooling sections 39 and 36 are interconnected by means of screws 56, with interposition of a thin aluminum disc 57 serving as an electrode. The disc 57 is not anodically oxidized and is sealed by means of seal rings 59 accommodated in annular grooves 58 in discs 16 and 17. Shoulders 60 of the discs 16 and 17 protect the rings 59 and the inner edge of the disc 57. This inner edge may be optionally covered by an adhesive such as Araldite which serves the purpose of protecting the edge from ion bombardment and ultra-violet rays. The diameter of the array of connectors between discs 16 and 17 to each other is considerably larger than those of the discs 17–20 to each other, which simplifies the connection between the sections 36 and 39. The disc 57, which serves as an auxiliary anode during ignition, has a screw 61 connected thereto by which an electrical wire (not shown) can be connected to disc 57. A low resistance voltage divider is provided for the anode-cathode voltage, and is connected in regular spacing with the auxiliary anodes 57 between adjacent cooling sections in order to facilitate the ignition of the discharge. A further high-resistance voltage divider is provided for the anode-cathode voltage, which is connected in regular spacing with the single discs 14–20 in order to provide constant voltage drop along the discharge column in a known manner. As a variation of the above, the voltage along the column can also be stabilized by using the coolant flowing through the channels 26, 27 as a volage dividing resistance and by removing the insulating layer at several locations on the surface of channels 26, 27 of the discs 17–20. If the adjoining connecting pieces of consecutive cooling sections are electrically interconnected, it is not necessary to provide a separate voltage dividing resistance. In a further variation, only a part of the holes 26 and 27 may be used for the flow of a cooling fluid, and one or a plurality of these holes for a direct connection of the anode chamber 1 with the cathode chamber 2, which excludes the need to provide a separate pressure compensating tube as shown in FIG. 1. The end parts 41 and 42 have to be, of course, changed accordingly.

The illustrated discharge tube 13 consists of only the body 55 surrounding the discharge column and two connecting means for connection to the chambers 1 and 2, the connecting means comprising assemblies 62 constituted by parts 41, 42, 52, 53. It is also possible to construct the discharge tube in such a manner that it incorporates the anode and the cathode and is provided with the necessary windows for the output of the light rays, which can also be arranged in a known manner in the Brewster angle. In such a case certain structure is unnecessary, as for instance the bellows 53 which facilitate change of length of the tubular body between the rigidly mounted chambers.

What is claimed is:

1. A vacuum gas discharge tube for a laser assembly comprising a plurality of juxtaposed, mutually electrically insulated metal discs provided with mutually aligned central bores defining a discharge column, means rigidly interconnecting said discs, and discs each having an oxide layer on its surface which insulates the disc electrically from the other discs and protects the discs from damage caused by ion bombardment and ultra-violet rays from the discharge column, and sealing means between said discs for sealing the discs against a vacuum of less than 10 torr inside the tube, said discs including projecting shoulders covering said sealing means to protect the same against ion bombardment and ultra-violet rays, said discs being provided with holes arranged around the central bores thereof and communicating with one another to define a channel for the flow of a cooling fluid.

2. A gas discharge tube according to claim 1 wherein said central bore has a diameter $d$ larger than 10 mm.

3. A gas discharge tube according to claim 1 wherein said central bore has a length $l$ and a diameter $d$ and $l/d<3$.

4. A gas discharge tube according to claim 1 wherein said discs are made of aluminum or an aluminum alloy, said oxide layer being an anodic oxidation insulation layer.

5. A gas discharge tube according to claim 4, wherein said oxide layer contains titanium, zirconium or mixtures thereof.

6. A gas discharge tube according to claim 1 wherein said discs constitute a body surrounding the discharge column and comprising connecting means at both ends of the body for attachment to anode and cathode chambers, the latter means including means to compensate for dimensional changes produced by temperature variations.

7. A gas discharge tube according to claim 1 wherein selected of said discs define a cooling section, said selected discs having aligned bores defining a passage for cooling fluid, and connection members connected to said cooling section for inlet and discharge of the cooling fluid.

8. A gas discharge tube according to claim 7 comprising a thin disc between adjacent discs in said cooling section, said thin disc being sealing at high vacuum and serving as an electrode, the electrodes being spaced for connection to a voltage divider in order to ignite the gas discharge.

9. A gas discharge tube according to the claim 1 wherein said means interconnecting the discs comprises insulated screws, said sealing means comprising annular rings between adjacent discs.

10. A gas discharge tube according to claim 1 wherein said means interconnecting the discs comprises adhesive means joining said discs and simultaneously serving as a sealing means.

11. A gas discharge tube according to claim 1 comprising projecting annular shoulders on said discs covering said sealing means, and an adhesive on said discs protected by said shoulders and serving to effect high vacuum sealing between said discs.

12. A gas discharge tube according to claim 11 wherein said shoulders have free edges which are rounded.

References Cited

UNITED STATES PATENTS

| | | | |
|---|---|---|---|
| 3,437,950 | 4/1969 | Okaya et al. | 331—94.5 |
| 3,501,714 | 3/1970 | Myers et al. | 331—94.5 |
| 3,522,551 | 8/1970 | Fendley | 331—94.5 |
| 3,594,661 | 7/1971 | Roulot | 331—94.5 |

ROY LAKE, Primary Examiner

D. R. HOSTETTER, Assistant Examiner

U.S. Cl. X.R.

313—185, 196, 198; 331—94.5